(No Model.)
T. H. JOHNSON.
ANIMAL MUZZLE.
No. 518,845.      Patented Apr. 24, 1894.
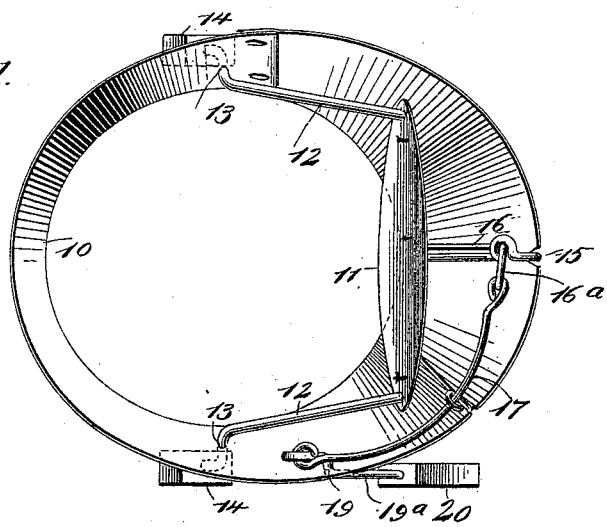
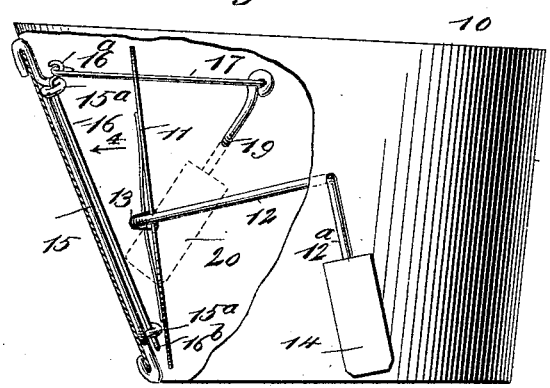
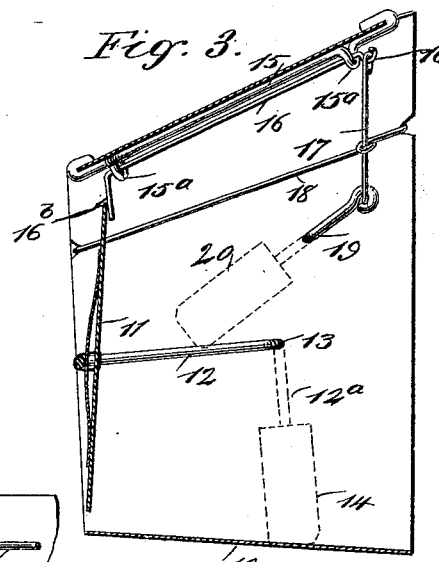
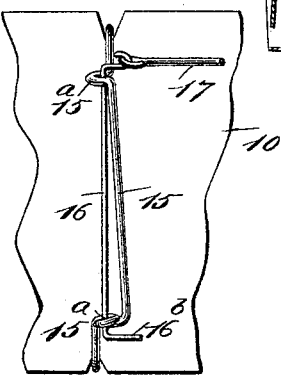
WITNESSES:
John A. Rennie
C. Sedgwick
INVENTOR
T. H. Johnson
BY
Munn & Co
ATTORNEYS.

UNITED STATES PATENT OFFICE.

THOMAS H. JOHNSON, OF PLYMOUTH, FLORIDA.

ANIMAL-MUZZLE.

SPECIFICATION forming part of Letters Patent No. 518,845, dated April 24, 1894.

Application filed January 5, 1894. Serial No. 495,816. (No model.)

*To all whom it may concern:*

Be it known that I, THOMAS H. JOHNSON, of Plymouth, in the county of Orange and State of Florida, have invented a new and useful Improved Animal-Muzzle, of which the following is a full, clear, and exact description.

My invention relates to an improved muzzle for cows or other grazing animals. In localities where fruit is extensively grown, particularly oranges, it is desirable to graze cattle in the field or grove wherein the fruit trees are located. Horses or cows if unrestrained, will feed on the leaves and tender branches of orange trees, to the great injury of the trees.

The object of my invention is to provide a simple muzzle for cattle or horses, which will permit them to eat grass or herbage with their heads in a lowered position, and that will automatically adjust its parts when the head is elevated, so as to close the front of the muzzle and lock it in closed adjustment.

To this end, my invention consists in the construction and combination of parts, as is hereinafter described and claimed.

Reference is to be had to the accompanying drawings, forming a part of this specification, in which similar figures of reference indicate corresponding parts in all the views shown.

Figure 1 is a plan view of the muzzle, showing its parts in open adjustment. Fig. 2 is a side view of the muzzle in open adjustment, its interior being exposed through a break in the main wall of the device. Fig. 3 is a sectional side view showing parts in a closed condition; and Fig. 4 is an inside view of a portion of the device, taken opposite the arrow 4 in Fig. 2.

The frame wall 10 of the muzzle is shown as constructed of sheet metal, but it may also be made of strong woven wire fabric, or other suitable material. The frame 10 is formed as shown in the drawings, comprising a truncated coniform wall, that is preferably given a greater inclination from its smaller end, at a point which is uppermost when in position on an animal, and to conform the frame to the general shape of the muzzle portion of the beast's head, said frame is laterally compressed, thereby rendering it elliptical, as plainly shown in Fig. 1, the longer axis coinciding with the median line of the animal's head.

Within the frame 10, an oval guard piece 11 is sustained, and is supported free to swing near the smaller end of the frame, by the two similar hanger limbs 12, that have one end of each secured to the guard piece oppositely at its edge near the longitudinal center of the same. A proper length is afforded to the limbs 12, and at an equal distance from the guard piece said limbs are outwardly bent at a right angle so as to provide journals for a loose engagement with opposite perforations in the wall of the frame 10. The length of the limbs 12, between the points 13 of their engagement with the frame and where they are attached to the guard piece, is so proportioned to the dimensions of other parts of the device, that the guard piece will be adapted to receive a swinging adjustment, whereby it may be disposed to cover the normally lower end of the frame 10, or be rocked on the journals 13, to entirely remove said part 11 from over the smaller end of the frame. The portions $12^a$ of the hanger limbs 12, which are projected outside of the frame 10, are bent to hang about at a right angle to the inner portions of the same, and on the ends of these portions or arms, a weight 14 of suitable form and heft is affixed to each, as indicated in Figs. 1 and 2. It will be seen that when the frame 10 is secured upon the head of a cow or other grazing animal, and the beast lowers its head to eat grass or herbage from the ground, the rocking movement of the weighted arms $12^a$ effected by their gravity, will carry the guard piece 11 forwardly and upwardly, so as to entirely remove it from over the lower end of the muzzle frame 10, and permit the animal to graze freely. Should the beast having the improvement secured in position on its head, attempt to reach the lower limbs or leaves of a tree, to chew them, the act of raising the head to a level position or above the body, will instantly produce an adjustment of parts that will locate the guard piece 11 over the smaller end of the muzzle frame 10, and thus prevent the animal from injuring the tree.

In order to lock the guard piece 11 so that the animal may not move it by licking or pushing said part with its tongue, a simple automatic locking device is provided, consisting of the following parts: On the front sloping wall of the frame 10, a wire brace rod 15, is affixed by a hooked engagement of its ends with the notched edges of the frame, or by any other available means, said rod having two rings $15^a$ formed in it, one near each end, that afford a loose support to the upright rock shaft 16. A crank arm $16^a$ is formed on the rock shaft 16, at its upper end, which arm terminates in a hook. On the lower end of the shaft 16, a locking finger $16^b$ is formed, which lies in the same plane with the crank arm $16^a$, the length of the finger being sufficient to project it above the guard piece 11, as represented in Fig. 3, when the shaft is rocked to effect a locked condition of the guard piece. A link rod 17, formed of wire or other suitable material, is loosely connected to the hook-ended crank arm $16^a$, by the formation of an eye on one end of the link and the engagement of the hook and eye, as plainly shown in Fig. 4. The link rod 17 is laterally curved to conform with the frame 10, and is supported to slide by its engagement with an eye formed in a carrier rod 18, which latter has hooks produced on its ends for a hooked engagement with the edges of the frame, or any other equivalent support may be employed in lieu of the carrier rod. A rock arm 19, is provided, which is bent into Z-form, the transverse member of this arm affording a journal for an engagement with a perforation in the wall of the frame 10, this loose connection of parts permitting one member of the rock arm to project toward the larger open end of the frame for a hooked attachment to the adjacent end of the link rod 17. The portion $19^a$ of the rock arm 19, which hangs outside of the frame 10, is furnished with a weight block 20. The relative proportion and arrangement of parts in the locking device causes the rock shaft 16, to be partly rotated when the head of the beast is elevated, the direction of rotation serving to project the finger $16^b$ above the guard piece at its adjacent edge, immediately after said piece 11 has been rocked into closed condition, as indicated in Fig. 3. The provision of the automatically adjustable locking device prevents the animal from rocking the guard piece with its tongue, and effectually restrain the beast from opening the nose end of the muzzle to injure the foliage, limbs, or fruit of trees that are in the field where the animal is pasturing. The automatic releasing operation of the locking device, by gravity of the weight 20, simultaneously with the depression of the animal's head, allows the weights 14 to rock the guard piece away from the nose opening of the muzzle frame, so as to permit the animal to freely graze when the head of said beast is near the ground. The weighted arms may be protected by any form of guards to prevent their injury, and if preferred, may be arranged to operate on the inside of the muzzle frame.

Having thus described my invention, I claim as new and desire to secure by Letters Patent—

1. In an animal muzzle, the combination, with a frame fitting the muzzle of the animal, and a gravity-actuated guard piece at the nose of the frame, of a gravity-actuated locking device for the guard piece, substantially as described.

2. In an animal muzzle, the combination, with a frame fitting the muzzle of the animal, of a guard piece in disk form, limbs arranged to support the guard piece in loose engagement with the frame, weights on said limbs adapted to rock the guard piece, and a locking device for the guard piece, substantially as described.

3. In an animal muzzle, the combination, with a frame fitting the muzzle of the animal, and a gravity-actuated rocking guard piece, of a locking device comprising a supported rock shaft at the front of the frame, an arm on the upper end of said shaft, a finger on the lower end of said shaft, a weighted rock arm on the side of the frame, and a link connecting the rock shaft and the weighted rock arm, substantially as described.

THOMAS H. JOHNSON.

Witnesses:
THOS. D. BOURLAND,
M. T. NETHERTON.